Feb. 18, 1930.   C. W. NEELY ET AL   1,747,678
PIPE LINING MACHINE
Filed Oct. 21, 1926   2 Sheets-Sheet 2

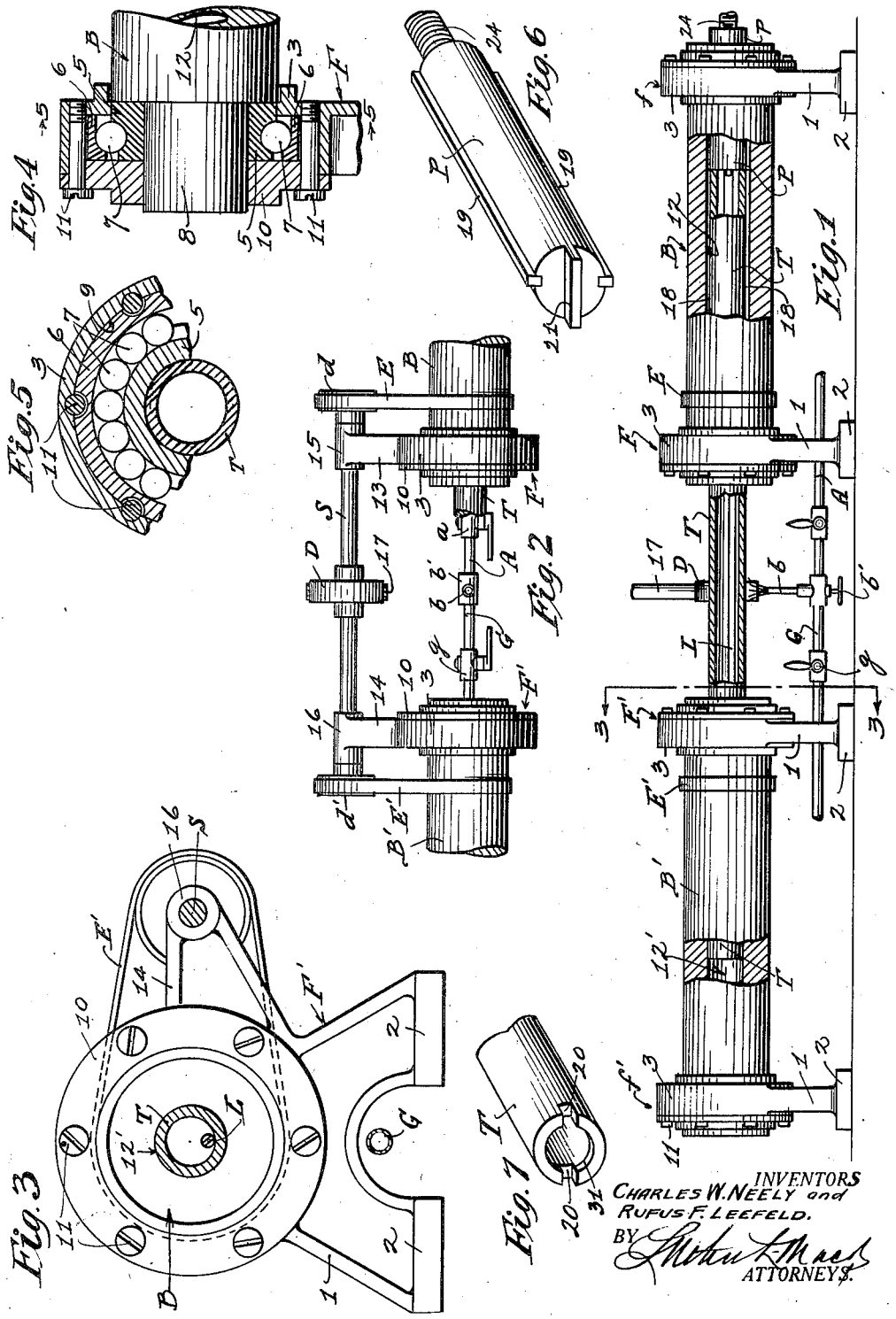

INVENTOR.
CHARLES W. NEELY and
RUFUS F. LEEFELD.
BY
ATTORNEYS.

Patented Feb. 18, 1930

1,747,678

UNITED STATES PATENT OFFICE

CHARLES W. NEELY AND RUFUS F. LEEFELD, OF LONG BEACH, CALIFORNIA

PIPE-LINING MACHINE

Application filed October 21, 1926. Serial No. 143,147.

This invention relates to and has for a main object the provision of an improved method and means for lining metallic tubes or pipes, such as are used in condensers and other mechanical devices, whereby a protective non-corrosive lining of substantial and uniform thickness may be attached to the inner periphery of the pipes or tubes.

Another object is to provide means for rotating the tubes at a high speed and for supporting the same in a straight line concentric with the axis of the rotating means, whereby a lining metal such as lead supported within the tubes may be fused during the rotation of the tubes and distributed uniformly over the inner peripheries of the same by centrifugal force.

Another object is to provide means for heating the tubes whereby the lining metal may be fused or melted, and means for progressively moving the tubes to be treated longitudinally with respect to the heating means.

Other minor and detailed objects include the provision of means for rotatably connecting the pipes with the rotating means, and means formed at the ends of the pipes providing gauges for determining the thickness of the lining applied thereto.

Still other objects may appear as the description progresses.

In the accompanying drawings we have shown a preferred eembodiment of our invention, illustrating our improved method and means for lining pipes, subject to modification within the scope of the appended claims without departing from the spirit of our invention.

In said drawings:

Fig. 1 is a side elevation of a machine suitable for carrying out the objects of our invention, the same being partly in section.

Fig. 2 is a fragmentary plan view of the same.

Fig. 3 is an enlarged transverse sectional elevation on line 3—3 of Fig. 1.

Fig. 4 is an enlarged sectional view of one of the rotating barrels, and bearing for operatively supporting the same.

Fig. 5 is a fragmentary transverse section of the same on line 5—5 of Fig. 4.

Fig. 6 is a perspective view of a plunger cooperating with the rotatable bearings for effecting the longitudinal movement of the pipes during the lining operation.

Fig. 7 is a perspective view of one of the pipes, showing means for rotatably connecting the pipes with the plunger shown in Fig. 6.

Figure 14:
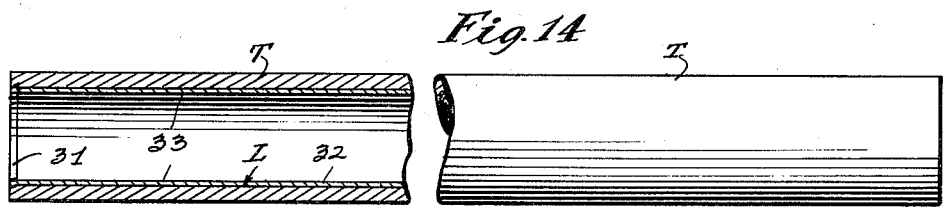
Fig. 14 is a longitudinal view, partly in section, of a pipe to which the lining has been applied.

In the consideration of this invention it will be understood that heretofore the application of linings to pipes of the kind shown and described herein have been accomplished usually by swabbing the interior periphery of the pipe first with a suitable flux, and thereafter with a fused metal such as lead, but in such cases the lining is very thin and is film-like in character, whereas in my present invention I have provided a method and means whereby linings of substantial thickness may be provided, so that where the pipes are used for condensers through which salt water is passed, a corrosion of the pipes will not occur and the linings will be of long life, thus effecting a substantial economy in the operation and use of devices in which lined pipes are necessary.

The dimensions of the machine such as we have shown in our drawings and hereinafter describe are variable to suit different conditions and for the treatment of different size pipes, all of which is immaterial to our invention.

Briefly described, our invention embodies a pair of longitudinally alined barrels B and B', which are supported in spaced relation on frames F and f and F' and f' respectively, the number of the frames for each barrel being determined by the length of the barrel. The frames F, F', f and f' are similar and are provided with base portions 1, 1, etc., with feet 2, 2, adapted to rest upon and be secured to a suitable base or foundation (not shown) and the upper portion of said frames are provided with annular bearing portions 3, 3, etc., which are adapted to rotatably support the barrels B and B' on frictionless ball or roller bearings, each comprising an inner cone 5, an outer cone 6, and a series of balls 7. The inner cones 5 are tightly fitted on a reduced extension 8 of the barrels, while the outer cones 6 are fitted into a bore 9 of the bearing portions 3. The frictionless bearings are enclosed by means of caps 10 which are secured to the portions 3 of the frames by means of a series of bolts or screws 11, 11, etc.

Barrels B and B' are provided with concentric bores 12 and 12' respectively, which are longitudinally alined and are of the same diameter and are adapted to rotatably and slidably receive tubes T, and the plunger P, shown in Fig. 6. The inner ends of the barrels B and B' are spaced apart for a few inches, usually six to eight inches, depending upon the length and diameter of the pipes to be treated, and a gas or fuel burner $b$ is positioned centrally between the barrels B and B' and beneath the pipes or tubes T, so that as the tubes T are rotated at a high speed and moved longitudinally through and from the barrel B to and through the barrel B', the tubes may be heated for melting a bar of lead, as at L, which is deposited in the tubes T at the beginning of an operation.

The burner $g$ has a control valve $b'$ from which a gas pipe G and an air pipe A lead outwardly to sources of air and gas supply. A valve $g$ is interposed in the gas line G, and a valve $a$ is provided in the air line A, whereby the supply of air and gas may be independently regulated and controlled. Either fuel or liquid gas may be employed, and compressed air when and if necessary, for obtaining a sufficient heat at burner $b$ for melting the lead L in the pipes T.

The central bearings F and F' have extensions 13 and 14 respectively, formed thereon with bearings 15 and 16 on the outer extremities of said extensions, which are adapted to rotatably receive a counter-shaft S, to which a driven pulley D may be attached for communicating motion to the barrels B and B' through the medium of a belt 17 operative over the pulley D, and connecting the same with a motor or other source of power.

The outer ends of the drive shaft S are provided with pulleys $d$ and $d'$, respectively, which are operatively connected by means of belts E and E', respectively, with the barrels B and B', the pulleys being of such a size that the barrels B and B' will rotate at the same speed.

One or both of the barrels B and B' may be provided with longitudinal key-ways 18, 18 adapted to slidably receive keys 19, 19 held on the periphery of the plunger P, shown in Fig. 6, so that the plunger P will be rotatably connected with one or both of the barrels during the operation of the machine. The bores 12 and 12' of the barrels B and B', respectively, may be made to snugly fit the peripheries of the pipes T, so that said pipes when inserted in said bores will be rotated by frictionless contact with the barrels, but when and if a positive connection is necessary the ends of the pipes T may be slotted on the ends at 20, 20 diametrically of the pipes, so as to receive a diametrical rib 21 formed on the inner end of the plunger P. The plunger being rotatably connected with the barrel B at the beginning of an operation will thus cause the rotation of the pipe T at a speed identical with that of the barrels B and B'.

Figure 9:
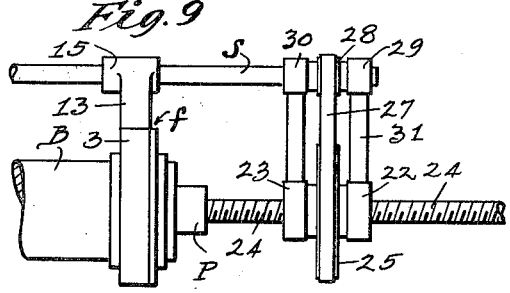
Fig. 9 is a plan view of the same.
Figure 10:
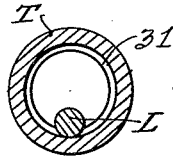
Figure 8:
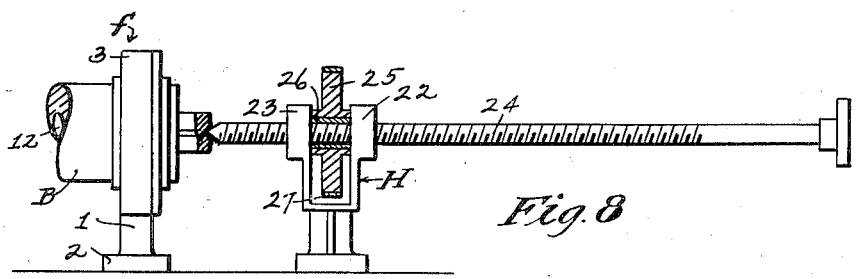
Fig. 8 is a fragmentary side elevation, partly in section, showing a screw feed for moving the plunger, shown in Fig. 6, longitudinally through the barrels of the machine.

The plunger P may be moved slidably through the barrels B and B' for advancing the pipe T over the burner $b$, by manual or automatic means, but we prefer to use a screw feed of simple character, such as is shown in Figs. 8 and 9 for this purpose.

Said feeding device embodies an auxiliary frame member H, suitably fixed to the foundation and alined with the other frame members supporting the barrels B and B', and may be provided with spaced bearing portions 22 and 23 adapted to rotatably and slidably receive a feed screw 24. A screw operating pulley 25 is mounted on the screw 24 intermediate the bearings 22 and 23, and carries an internally threaded bushing 26, as shown in Fig. 8. Said pulley is operated by means of a belt 27 which runs over a smaller driving pulley 28 on the counter-shaft S, which is extended from the frame $f$ of barrel B and through bearings 29 and 30 on an extension 31 of the frame H, as shown in Fig. 9.

At the beginning of an operation a pipe is inserted through the barrel B' and forced to the right till the inner end of the pipe T is near the right hand end of barrel B, while the left hand end of the pipe will be just inside of the right hand end of barrel B'. When a pipe is so positioned the plunger P will have its left hand end slightly extended into the barrel B and the opposite end thereof adjacent the bearing 23 of barrel H. The screw 24 is then turned so that the inner end of the screw will abut the outer end of plunger P. Prior to the placing of the plunger P a strip or bar of lead as at L, is inserted in the full length of pipe T and power is applied, so that the barrels B and B', pipe T, plunger P and screw 24 will be rotated. The speed of the screw 24 is preferably substantially less than that of the barrels B and B', due to the ratio between the pulleys 25 and 28 which operate the screw.

The plunger P being rotatably connected with the barrel B and the screw 24 being in abutting relation with said plunger, the rotation of the screw will advance the screw and the plunger P inwardly of the barrel B, and thus effect a longitudinal movement of the pipe T through the barrel B and barrel B', while the same is being rotated at a substantially high speed and while heat is being applied to the pipe T and lead bar L from burner $b$. The heat from the burner is sufficient to melt the lead L and the centrifugal force set up by the rapid rotation of pipe T will cause the melted lead to be distributed uniformly and smoothly over the inner periphery of the pipes T.

Figure 13:
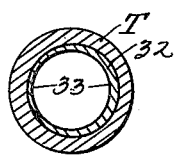
Fig. 13 is a similar cross section of pipe, showing a lining attached to a pipe, in which the bore of the pipe is eccentric with respect to the periphery thereof.
Figure 12:
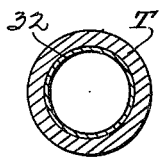
Fig. 12 is a transverse section of a pipe, showing a concentric lining attached to the interior of the pipe.
Figure 11:
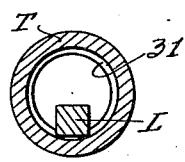
Figs. 10 and 11 are transverse sections of pipes adapted to be lined in our improved machine, showing respectively, bars of lining metal such as lead, and having different cross sections positioned in the pipes in readiness for a lining operation.

The ends of the pipes T are slightly rolled or otherwise formed so as to provide annular ribs 31 at the ends of the pipes the openings through which are of a diameter corresponding to the proposed diameter of the pipe after the linings have been applied. These ribs serve to prevent the overflow of the metal in the end of the pipes and to cause a uniform distribution of the metal throughout the periphery of the pipes. In some cases, as indicated in Fig. 13, the bores of the pipes are eccentric with respect to their outer peripheries, and in such case the ribs 31 will be so formed as to be concentric with the outer peripheries of the pipes, and the linings 32 when applied to the pipes in the manner stated will cause the bore 33 in the lined pipe to be concentric.

Prior to the application of the lead linings L, the internal peripheries of the pipes are treated with a flux such as muriatic acid or other suitable chemical, by any means such as swabbing or dipping the pipes so as to effect a chemical union between the lead and the pipes which will cause the linings to remain permanently affixed.

The barrels B and B' being spaced apart and yet close together at their inner ends and of substantial length serve to support the pipes T in parallelism with and concentric about the axis of said barrels during the rapid rotation of the same, so that centrifugal force will serve to distribute the lining metal L uniformly throughout the length and inner surfaces of the pipe.

It will be observed by reference to the drawing and description of our invention, that we have supplied a simple, economical and rapid means of applying linings to pipes of any desired length and diameter, in such a manner that the linings will be of uniform diameter and thickness and of such a substantial thickness that corrosion can not result from liquids which may be moved through or held in the pipes T.

In some cases it may be desirable, in order to prevent oxidation of the lining, to introduce into the tubes T a gas such as carbon-dioxide, which in the presence of the fused lining metal prevents the oxidation of the lining and at the same time provides a stronger and more uniform bond between the tubing walls and the lining material. It will be obvious to those skilled in the art that this may be accomplished by making the plunger P, as shown in Fig. 6, and the feed screw 24 hollow, so that a suitable hose connection may be made with the feed screw in order that the gas from the hose may be discharged through the screw 24, plunger P into the tubes T.

What we claim is:

1. A pipe lining machine including longitudinally alined rotatable barrels, spaced apart at their inner ends and adapted to receive and support a pipe to be lined, means rotatable with and slidable in the barrels for moving said pipe longitudinally during the rotation thereof, and means for applying heat to the pipe during the rotation and longitudinal movement thereof, for the purpose described.

2. A pipe lining machine including a pair of longitudinally alined barrels, spaced apart at their inner ends, means for rotating said barrels, and means rotatable with and slidable in connection with said barrels for moving a pipe longitudinally through the barrels during the rotation thereof, said pipe moving means being connected with the pipe for effecting the rotation thereof.

3. A pipe lining machine including a pair of longitudinally alined barrels, spaced apart at their inner ends, means for rotating said barrels, a plunger rotatably and slidably connected with said barrels and adapted for connection with and for moving a pipe longitudinally through the barrels during the rotation thereof whereby successive portions of said pipe may be exposed, and means for heating the exposed portion of said pipe, for the purpose described.

4. A pipe lining machine including a barrel rotatable about a horizontal axis, for rotatably and slidably supporting a pipe therein, a plunger slidable in said barrel for exposing successive portions of said pipe, said pipe carrying a fusible metal internally thereof, and means for applying heat to the exposed portions of said pipe for fusing said metal, the rotation of said pipe serving to distribute the fused metal over the interior of the pipe.

5. A pipe lining machine including spaced bearing members horizontally alined, a barrel rotatably supported therein and having a conical bore longitudinally thereof, for supporting a pipe rotatably in said barrel, and having a strip of fusible metal held therein, means for rotating said barrel, and means fixed for rotation with and longitudinally movable in said barrel for extending successive portions of said pipe from the barrel, and means for applying heat to the exposed portion of said pipe for fusing the lining metal as and for the purpose described.

6. A pipe lining machine including a rotatable barrel having a longitudinal bore therein, adapted to receive a pipe rotatably therein, a plunger slidable in said barrel and operatively connected with said pipe for extending successive portions of said pipe from one end of the barrel, automatic means for operating said plunger, and a burner for applying heat to the exposed portion of said pipe for fusing a lining metal held therein, the centrifugal force set up by the rotation of said pipe serving to distribute the fused metal over the inner periphery of said pipe.

7. A pipe lining machine comprising a pair of longitudinally alined horizontally disposed barrels, means for rotating said barrels, a plunger in one of said barrels and means engaging said plunger for moving a pipe longitudinally during the rotation thereof for exposing successive portions of the same, and means for applying heat to the exposed portion of said pipe for fusing a metal held in said pipe, the rotation of said pipe serving to distribute the fused metal over the interior of the pipe to provide a lining therefor.

RUFUS F. LEEFELD.
CHARLES W. NEELY.